United States Patent
Duggan et al.

[11] Patent Number: 6,056,429
[45] Date of Patent: May 2, 2000

[54] METHOD FOR PROCESSING HIGH MOLECULAR WEIGHT ELASTOMERS

[75] Inventors: James A. Duggan, Machesney Park, Ill.; Bharat K. Jani, East Brunswick; Tony R. Puri, Sparta, both of N.J.; Susan B. Filardo, Tuxedo, N.Y.; Arthur W. Upmann, Rockton, Ill.

[73] Assignee: Warner-Lambert Company, Morris Plains, N.J.

[21] Appl. No.: 09/173,999

[22] Filed: Oct. 16, 1998

Related U.S. Application Data

[63] Continuation of application No. 08/725,406, Oct. 3, 1996, Pat. No. 5,853,243.

[51] Int. Cl.⁷ .......................... B29C 47/10; B01F 15/06; B01F 15/02
[52] U.S. Cl. .................... 366/76.1; 366/76.9; 366/148
[58] Field of Search .................. 366/76.9, 76.92, 366/76.93, 76.1, 183.1, 183.2, 144, 148; 222/146.2, 146.4, 146.5; 414/199, 147, 150, 152, 208, 216; 193/2 R, 10; 209/911

[56] References Cited

U.S. PATENT DOCUMENTS

| | | | |
|---|---|---|---|
| 4,323,174 | 4/1982 | Wood | 222/146.2 |
| 4,453,867 | 6/1984 | Sharps | 366/98 |
| 4,474,311 | 10/1984 | Petrecca | 222/146.5 |
| 4,555,407 | 11/1985 | Kramer et al. | |
| 4,636,084 | 1/1987 | Kopernicky | 366/76.93 |
| 4,641,764 | 2/1987 | Faulkner, III | 222/146.2 |
| 4,771,920 | 9/1988 | Boccagno et al. | 222/146.5 |
| 4,816,265 | 3/1989 | Cherukuri et al. | |
| 4,848,420 | 7/1989 | Claassen | 222/146.2 |
| 5,000,965 | 3/1991 | Killeen et al. | |
| 5,057,328 | 10/1991 | Cherukuri et al. | |
| 5,135,762 | 8/1992 | Vernon et al. | |
| 5,297,865 | 3/1994 | Engel et al. | 366/76.9 |
| 5,374,120 | 12/1994 | Possanza et al. | 222/146.2 |
| 5,486,366 | 1/1996 | Song et al. | |
| 5,650,083 | 7/1997 | Bondson et al. | 222/146.5 |
| 5,715,972 | 2/1998 | Siddiqui | 222/146.5 |

FOREIGN PATENT DOCUMENTS

| | | |
|---|---|---|
| 0 763 331 | 3/1997 | European Pat. Off. |
| 2 635 441 | 2/1990 | France |
| 1 360 617 | 7/1974 | United Kingdom |

*Primary Examiner*—Tony G. Soohoo

[57] ABSTRACT

A process and apparatus for melting and processing a high molecular weight elastomeric material for a gum base or chewing gum product is disclosed. The solid elastomeric material, which preferably is polyisobutylene, is heated and melted into a liquid material which is then transported to an extruder. The apparatus has a heated housing section which includes sets of heated plate members arranged in fan-type groupings. Heated diverter members are positioned beneath the sets of fan-type plates. A heated angled conduit section is positioned below the housing section and a heated storage section is attached to the angled conveyance section. A valve and pump system is used to discharge the liquid elastomeric material from the holding section to the gum base or chewing gum extruder. Accurate metering and feeding of the liquified elastomeric material to a continuous extrusion process is achieved.

15 Claims, 2 Drawing Sheets

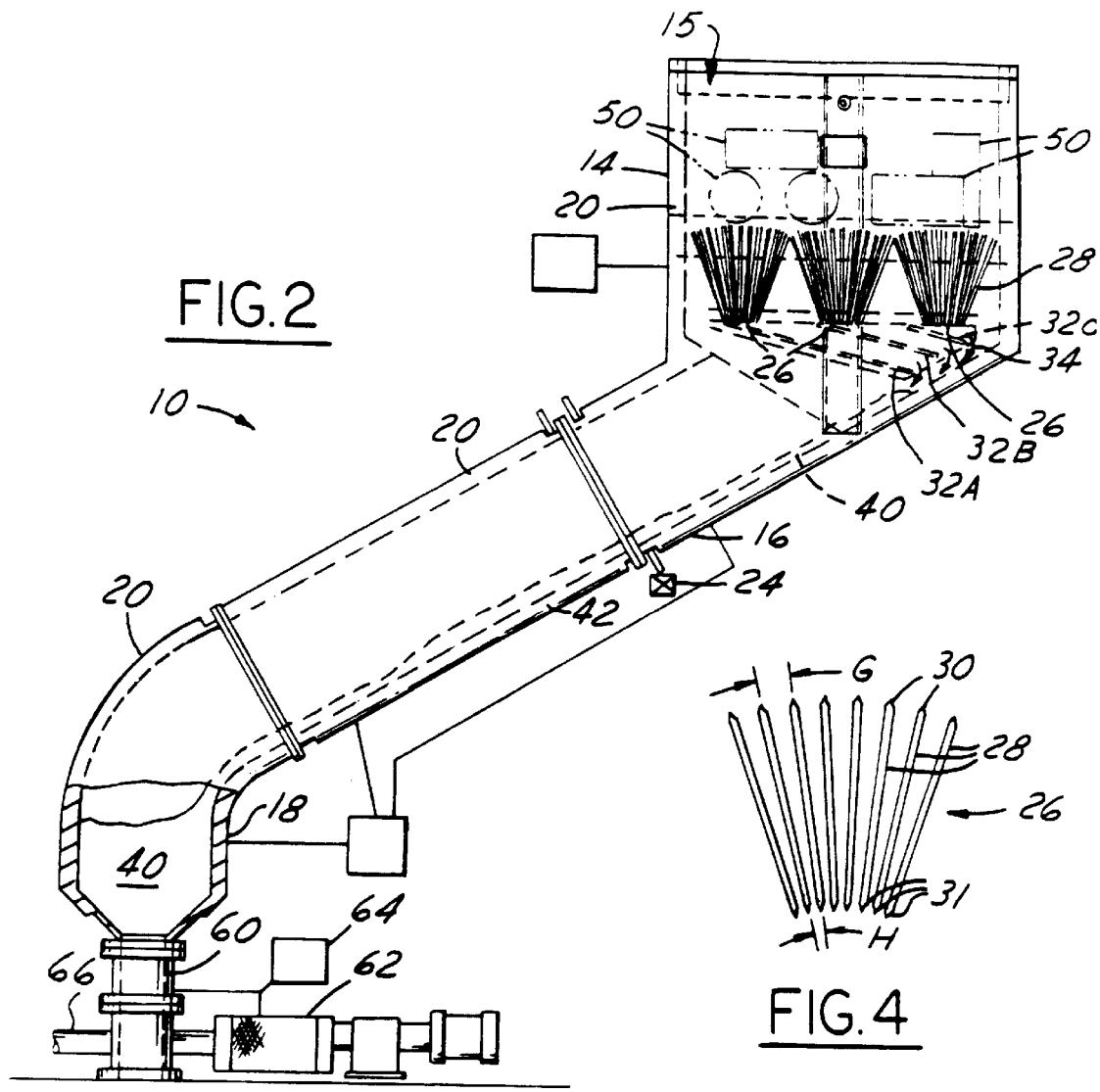
FIG. 2
FIG. 4
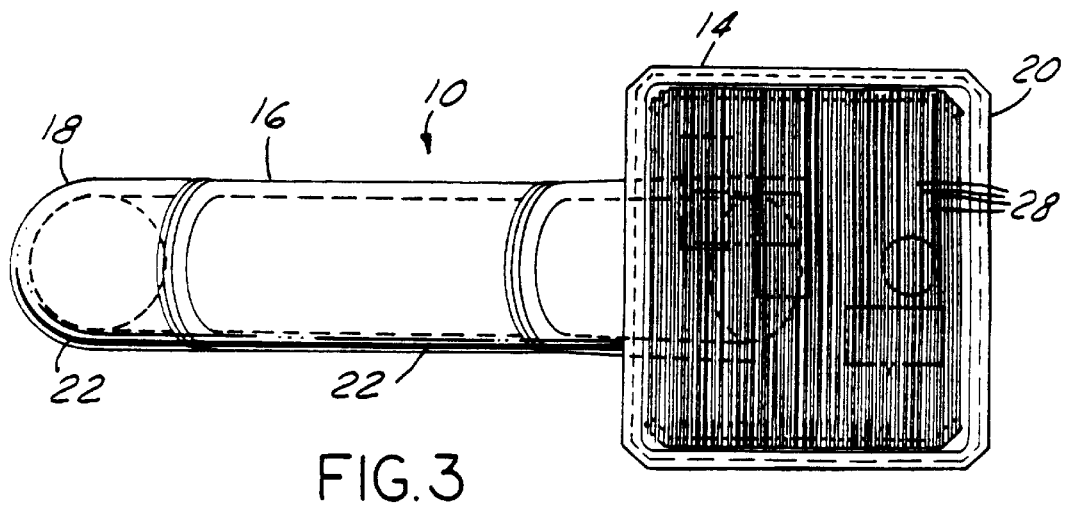
FIG. 3

METHOD FOR PROCESSING HIGH MOLECULAR WEIGHT ELASTOMERS

This is a continuation of application Ser. No. 08/725,406 filed on Oct. 3, 1996, now U.S. Pat. No. 5,853,243.

TECHNICAL FIELD

The invention is directed to an apparatus and method for the processing of highly viscous elastomeric materials, such as polyisobutylene, for chewing gum and chewing gum bases.

BACKGROUND OF THE INVENTION

Elastomers are one of the principal ingredients of a chewing gum base and thus in turn one of the principal ingredients of a final chewing gum product. Typically, a chewing gum base is made separately from the final chewing gum, although there are some systems which are capable of producing a final chewing gum product in one continuous process.

A chewing gum composition typically comprises a water-soluble bulk portion, a water-insoluble chewing gum base portion, and typically water-insoluble flavoring agents. The insoluble gum base generally comprises elastomers, elastomer solvents, plasticizers, waxes, emulsifiers, and inorganic fillers. The water-soluble portion dissipates with a portion of the flavoring agent over a period of time during chewing. The gum base portion is retained in the mouth throughout the time that the product is chewed.

The batch method of producing chewing gums has long been considered the standard for producing chewing gums, as well as gum bases, on a commercial scale. The batch processes, however, which typically used Sigma-blade mixers, tend to be labor-intensive and produce chewing gums of varying consistency.

Various efforts have been undertaken to try to simplify and reduce the time required for gum base and chewing gum manufacture, as well as to prepare gum base and gum products which have better and more consistent properties. For example, the use of continuous extruders to make a final chewing gum product are shown in U.S. Pat. No. 5,135,760 to Degady et al., U.S. Pat. No. 5,045,325 to Lesko et al., and U.S. Pat. No. 4,555,407 issued to Kramer et al. Also, there are several processes in the art for continuously producing a chewing gum base with the use of a continuous extrusion machine. These are disclosed, for example, in U.S. Pat. Nos. 5,419,919 and 5,486,366, both to Song et al.

The continuous gum base processes and final chewing gum product processes disclosed in these patents typically utilize a continuous extrusion machine, such as a twin-screw extruder. Continuous extrusion machines which can be used for producing a chewing gum base or a final chewing gum product, or both, include extruders from Japan Steel Works, Leistriztz, Werner & Pfleiderer Corp., and Buss Mfg. Co., WLS, Togum and Baker Perkins. These extruders typically have several different feed inlets where the ingredients are added, and the elongated screws inside the barrels of the extruders are equipped with different types of mixing and blending elements.

While different equipment manufacturers make different types of screw elements, the most common types include conveying elements, compression elements, reverse conveyance elements, homogenizing elements (such as shearing disks and toothed elements), and kneading disks and kneading blocks. These various types of elements, and other elements typically used in extrusion machines, especially twin screw extruders, are well known in the art and commercially available. The is elements are often specifically designed for the particular type of extruders utilized. In this regard, elements intended for similar functions will vary in design depending on the type of extruder for which they are intended.

Whether a batch-type processor or a continuous extruder-type processor is used to produce the chewing gum and gum base products, it is important to provide the various ingredients for these products in an optimum form and condition. This improves the speed and efficiency of the final processing. In this regard, ingredients such as the fillers, elastomers, plasticizers, oils, waxes, and the like, often require special handling or preparation prior to being included in the batch or extrusion process.

Preparation of the ingredients is especially important where a continuous extrusion processor is utilized. The ingredients supplied to the continuous extrusion apparatus are preferably provided in the optimum size, shape, condition and temperature for ease of handling, insertion and intermixing with the other ingredients in the extruder. Also, due to the properties of some of the various ingredient materials, it is necessary to pre-prepare or pre-blend them in order to allow them to be inserted in the extruder in the best possible condition.

As indicated, one important component of a gum base is the elastomeric portion which can include natural elastomers, synthetic elastomers, or combinations thereof. This element of the gum base is important in that it provides the insoluble body with resiliency to recover from deformation caused by chewing. In preparing gum base, it is important that other components which are included in the base composition to effect various characteristics of the resulting chewing gum, be thoroughly mixed with the elastomeric portion so that the entire gum base product will retain proper resiliency as a homogeneous phase.

Solid elastomers suitable for use in chewing gum bases and final chewing gum products include synthetic gums or elastomers such as butadiene-styrene copolymer, polyisobutylene, and isobutylene-isoprene copolymer, as well as natural gums or elastomers such as chicle, natural rubber, jelutong, balatea, guttapercha, lechi, caspi, sorva, or mixtures thereof.

Polyisobutylene is commonly used as one of the elastomer components for the gum base. Polyisobutylene adds "chewability" to the final gum product since many elastomeric materials, such as rubber, are hard to chew. Polyisobutylene materials are commercially available, for example, from Ritchem Corp. and Exxon Corp. (VISTANEX®).

Polyisobutylene and other elastomeric materials having high molecular weights, e.g. greater than 30,000, are difficult to work with in a commercial process. These materials are difficult to handle, melt, grind up and cut into smaller pieces due to their viscosity, consistency and characteristics. The difficulties in processing these materials are compounded when a continuous extrusion process is utilized where the materials need to be added in a predetermined amount and at a predetermined state and temperature.

When melting and processing these elastomeric materials, such as polyisobutylene, it is important not to trap air in the molten or liquified materials. Entrapped air prevents accurate and efficient metering of the material into a continuous extruder. Air entrapped also encourages undesirable oxidation of the material.

In batch-type processes, the high molecular weight elastomeric materials can be utilized more easily than with extruders. With batch-type processes, the bales, slabs or cylinders of material are simply inserted in the batch mixing tank and allowed to melt over time and mix with the other components in the tank.

In order to melt these materials, it is typically necessary to heat them in excess of 250–300° F. In order to utilize these materials in a chewing gum or gum base processing system using a continuous extrusion apparatus, it is necessary to also maintain them at such elevated temperatures in order for them to stay in a liquid condition. Such elevated temperatures, however, if used for any length of time in the main extruder, could adversely affect other ingredients in the system.

It is a general object of the present invention to provide an improved method and apparatus for the production of chewing gum products and gum base products. It is also an object of the present invention to provide an improved method and apparatus for preparation of high molecular weight elastomeric materials, such as polyisobutylene, in order to facilitate improved processing of chewing gum and gum base products.

It is still another object of the present invention to provide a method and apparatus for continuously melting and storing elastomeric materials, such as polyisobutylene. It is another object of the present invention to provide an improved process and apparatus for feeding high molecular weight elastomeric materials, such as polyisobutylene, in a liquid or melted condition into a chewing gum or gum base processing system which utilizes a continuous extruder.

These and other objects, benefits and advantages are met by the present invention which is detailed in preferred form in the following description.

SUMMARY OF THE INVENTION

The present invention provides an improved apparatus and process for producing a gum base and the final chewing gum product. A novel process and apparatus are used to melt and supply certain high molecular weight elastomeric materials, such as polyisobutylene, which are used as some of the ingredients of the gum base product. Preferably, the present invention is used with elastomeric materials having molecular weights in excess of 30,000. Where a continuous extrusion machine is utilized, the elastomeric materials prepared and supplied in accordance with the present invention can be fed and inserted directly into the barrel of the extrusion machine during the operation of a continuous, steady-state, gum base extrusion process.

In accordance with the present invention, a solid piece of the elastomeric material is positioned on sets or groups of heated plates arranged in "fan"-type configurations. The plates are internally heated, such as by circulation of heated oil, in order to reach the temperatures necessary to melt the material. A plurality of heated diverter members are positioned immediately below the heated melt plates. The melt plates and diverter members are positioned in a housing which is kept at an elevated temperature by steam-heated jackets. The housing in turn is connected to a heated sloped conduit which directs the melted and liquified material into a heated holding tank. The angled conduit and holding tank are both jacketed on their external surfaces with steam coils. In this manner, the conduit and holding tank are heated to temperatures above the melting point of the elastomeric material in the housing.

The elastomeric material positioned on the melt plates in the housing is slowly heated and melted and passed through the fan-type plates onto the diverter members. The melted material in turn is directed by gravity and without agitation or formation of air bubbles through the angled conduit and into the holding tank.

The liquified material is discharged from the holding tank by an isolation valve and pump mechanism. With the present invention, high weight elastomeric materials, such as polyisobutylene, are melted and contained as a liquid with minimum air entrapment and oxidation. The material is in a condition and temperature to be introduced directly into a continuous extrusion-type process and be precisely metered into it.

Other features, benefits and advantages of the present invention will become apparent when the following description of the invention is viewed in accordance with the attached drawings and appended claims.

BRIEF DESCRIPTION OF THE DRAWINGS

FIG. 2 is a side cross-sectional view of the processing system shown in FIG. 1;

FIG. 3 is a top view of the processing system as shown in FIGS. 1 and 2;

FIG. 4 depicts a preferred fan-type arrangement of heated melting plates in accordance with the present invention.

BEST MODE(S) OF PRACTICING THE INVENTION

Figures 1, 5:
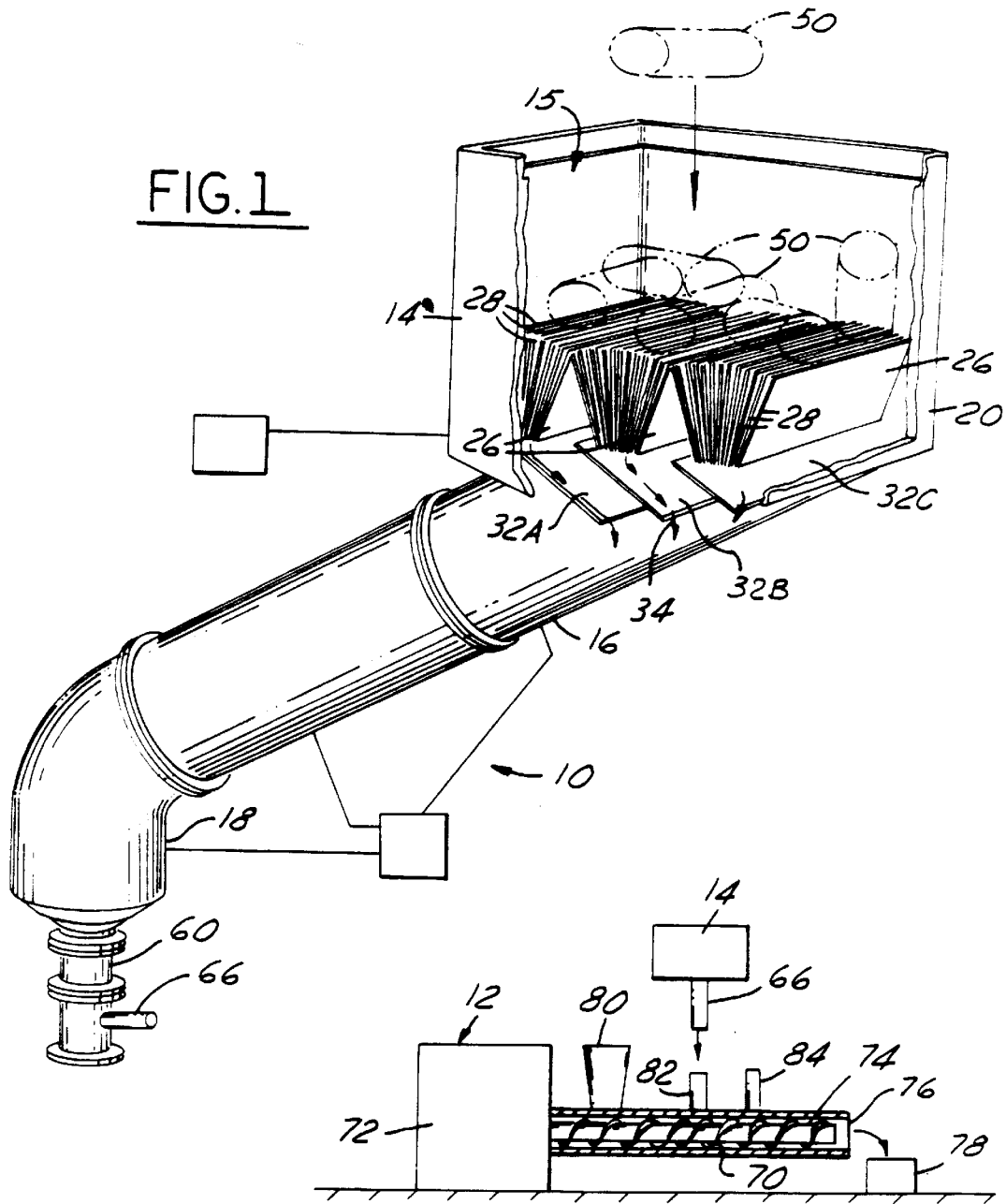
FIG. 1 is a schematic diagram of an elastomer processing system in accordance with the present invention.
FIG. 5 is a schematic diagram illustrating the use of the present invention with a continuous chewing gum or gum base extrusion process.

The present invention is particularly suitable for processing high molecular weight elastomeric products and materials, such as polyisobutylene, which are used as some of the ingredients in chewing gum bases and chewing gum products. One of the trade designations for polyisobutylene is Vistanex®, a product of Exxon Corp. Other commercially available polyisobutylene materials are available from Ritchem Corp. Preferably, the present invention is used with elastomeric materials having molecular weights in excess of 30,000.

In general, the present invention provides an apparatus and method for melting, storing and feeding high molecular weight elastomeric materials to facilitate their introduction and use in a continuous process for producing a chewing gum base or chewing gum product. In this regard, it is to be understood that the present invention can be used for preparing the polyisobutylene or other elastomeric component of either a chewing gum base or a final chewing gum product and can be used with either a batch-type system or a continuous extruder-type system.

In the preferred embodiment of the present invention, and for use in illustrating the present invention, it is described herein with reference to its use in a continuous gum base manufacturing system which utilizes an extruder. In particular, for use with a continuous gum base process, the present invention facilitates the feeding and intermixing of certain elastomeric components of the gum base with other ingredients and components of the gum base product.

A schematic illustration of the apparatus in accordance with the present invention is shown in FIG. 1 and referred to by the reference numeral 10. FIGS. 2 and 3 are side and top views, respectively, of the apparatus 10, with FIG. 2 being in partial crosssection. FIG. 4 is an enlarged view of the preferred fan-configured melt plates utilized with the present invention. FIG. 5 is a schematic diagram of the use of the present invention with a continuous gum base manufacturing process using a continuous extruder 12.

Elastomers are one of the principal ingredients of a chewing gum base and thus in turn one of the principal ingredients of a final chewing gum product. A typical chewing gum base includes one or more elastomers, together with one or more fillers, elastomer solvents, plasticizers and, optionally, polymers, waxes, emulsifiers and miscellaneous colors, flavors and antioxidants. The elastomeric portion of the product can include natural elastomers, synthetic elastomers, or combinations thereof. Solid elastomers suitable for use in chewing gum bases and the final chewing gum product include synthetic gums or elastomers, such as butadinestyrene co-polymer, polyisobutylene, and isobutyleneisoprene co-polymer, as well as natural gums or elastomers, such as chicle, natural rubber, jelutong, baletea, guttapercha, lechi, caspi, sorva, or mixtures thereof.

The elastomeric element of the gum base provides the insoluble body with resiliency to recover from deformation caused by chewing. With many gum bases and gum products, other elastomeric products, such as polyisobutylene, are added in order to increase the "chewability" of the gum. Many of these elastomeric materials, however, are difficult to handle and process. In particular, due to their low viscosity, high molecular weight and resultant characteristics and properties, these materials do not easily or rapidly change from a solid to a liquid. Moreover, these materials are difficult to accurately meter and introduce in a consistent manner to the gum base or chewing gum product, thus often resulting in non-uniform and inconsistent results.

Whether a batch-type process or a continuous extruder-type processor is used to produce the chewing gum and gum base products, it is important to provide the various ingredients for those products in the best form and condition. This improves the speed and efficiency of the final processing, and ensures consistency and uniformity from batch to batch and product to product. In this regard, ingredients such as the fillers, elastomers, plasticizers, oils, waxes, and the base often require special handling and preparation prior to being included in the batch or extrusion process.

Preparation of the ingredients is especially important where a continuous extrusion processor is utilized. The ingredients supplying a continuous extrusion apparatus are preferably provided in the optimum size, shape, condition (solid, liquid, etc.) and temperature for ease of insertion and intermixing with the other ingredients in the extruder. Also, the properties of many of the various ingredient materials require them to be pre-blended with other materials or to be solidified, broken up into particles, or liquified in order to be inserted in the extruder in the best possible condition.

Also, it is important to precisely control the amount of material that is added to the continuous extrusion processor in order to provide uniformity and consistency in the final product. Often, when elastomers, such as polyisobutylene, and other ingredients are melted and liquified, air becomes entrapped in them, or other impurities become embedded in them, which affects the unit weight and unit volume of the materials. Air also causes undesirable oxidation of the materials. These factors in turn affect the quality, uniformity and consistency of the final products.

The present invention provides an apparatus and method which melts and processes highly viscous, high molecular weight elastomeric materials, such as polyisobutylene, in an optimum manner for possible use in a continuous extrusion-type system. Preferably, the present invention is used with elastomeric materials having molecular weights in excess of 30,000. The material is uniformly melted in a heated tank and has a gravity transition from the tank to a holding area of the apparatus. This ensures a constant melting temperature and melting conditions for the material, and also eliminates air entrapment and other impurities from entering the system.

As shown in FIGS. 1–3, the apparatus 10 includes a housing section 14, an angled conveying or transport section 16 and a holding tank section 18. Each of the three sections 14, 16 and 18 are heated around their external peripheries in order to maintain a desired temperature internally in all sections of the apparatus 10. In this regard, housing 14, as well as sections 16 and 18, are externally jacketed with steam coils 20. These jackets have passageways and conduits for circulation of a heated fluid, such as steam, and are positioned on or around the external peripheries of the housing and adjacent sections. The steam coil members 20 are of conventional design and are supplied by steam from conventional sources (not shown) with appropriate temperature and delivery controls.

One or more load cells 24 are preferably positioned at various points on the apparatus in order to measure the weight thereof and determine the amount of heated and liquified material in the apparatus. In this regard, FIG. 2 depicts one load cell 24, although it is to be understood that a plurality of load cells can be provided in accordance with conventional practice.

Several sets 26 of heated melt plates 28 are situated in the housing 14. The plates 28 are positioned in sets 26 of fan-type groupings or arrangements as shown in FIGS. 1, 2 and 4. The plates have larger openings or gaps G at their upper ends and smaller openings or gaps H at their lower ends. Also, as shown in FIG. 4, the upper and lower elongated edges 30 and 31 of each of the plates 28 have pointed ends.

One or more diverter members are positioned immediately below the sets 26 of heated melt plates 28. In this regard, the embodiment of the invention shown in FIGS. 1 and 2 has three diverter members 32A, 32B and 32C. These correspond to the three sets 26 of heated melt plates. The plates 32A, 32B and 32C are of different lengths and are used to divert melted or liquified material flowing through the sets of plates toward the angled surface or surfaces of the conveyance section 16. This is shown by arrows 34 in FIGS. 1 and 2.

The housing and sections of the apparatus, as well as the melt plates and diverter members, are preferably each made from a stainless steel material. The melt plates and diverter members have internal cavities and are internally heated by the circulation of heated oil. Preferably the plates and members comprise two sheets of material welded together. The oil is heated and supplied by a conventional source (not shown).

The holding tank section 18 of the apparatus 10 is used to accumulate and store an amount of the liquified elastomeric material. As shown in FIG. 2, the material is melted and proceeds down the slanted side 42 of the angled conveyance section 16 and forms a batch of melted material 40 in the holding tank section.

The elastomeric material is introduced into the apparatus 10 through the open top 15 of the housing section 14. The elastomeric material can be supplied in any conventional solid form, such as slabs, bales, or cylinders, and can be introduced into the housing manually or by any conventional automatic mechanism, such as an overhead crane-type apparatus. In this regard, a plurality of cylinders 50 are shown in phantom lines in FIGS. 1 and 2 as being representative of the elastomeric materials used with the present invention. The solid pieces of material 50 are placed directly on the upper ends 30 of the heated plate members 28.

Preferably, the temperatures of the heated steam coils on the housing 14 and sections 16 and 18, as well as the temperatures in the heated melt plates 28 and diverter members 32A–C, are kept above the melting temperature of the elastomeric material used in the process. For example, with polyisobutylene, the temperature of the various components of the apparatus 10 are maintained at temperatures up to 500° F.

Due to the elevated temperatures in the apparatus 10, the elastomeric material positioned on the melt plates 28 in the housing section 14 melts in a slow and uniform manner. The material flows by gravity down through the fan-type groupings of heated plates 28, along the angled heated diverter members 32A, 32B and 32C, and against the heated angled side 42 of the conveyance section 16. The melted material then flows by gravity into the holding or storage tank section 18.

In order to use the liquified material for further processing, the apparatus 10 is provided with a valve mechanism 60 and pump mechanism 62. The valve and pump mechanisms 60 and 62 are controlled by a conventional control and delivery system 64 in order to discharge an appropriate amount of liquid elastomer material 40 when required for the chewing gum or gum base processing system. In this regard, a pipe or conduit 66 is attached to the valve mechanism 60 in order to provide the liquid material 40 to the extruder 12.

Referring now to FIG. 5, the extruder 12 includes an elongated barrel section 70 and a motor and control section 72. The barrel 70 has one or more elongated screw members 74 positioned in it which process the gum base ingredients and advance them in a homogeneous molten mass to the discharge end 76 where the mass is discharged into appropriate containers 78.

The extruder 12 has a number of inlet ports, three of which (80, 82 and 84), are shown. It is also possible for there to be a larger or smaller number of inlet ports for the extruder 12. In the representative extruder device 12 illustrated in FIG. 5, the liquid elastomeric material from apparatus 10 is introduced into the barrel 70 of the extruder through inlet port 82.

In order to melt and process an adequate amount of elastomeric material for a commercial gum base process, the apparatus 10 should have a substantial size and capacity. In this regard, for illustration, the housing section 12 can be several feet in dimension along each of its sides. Preferably, a system in accordance with the present invention has a melting tank apparatus that melts the elastomeric material at a temperature as high as 500° F. For commercial purposes, the apparatus 10 preferably has the ability to melt several hundred pounds per hour of the melted material and hold it at the desired delivery temperature. The delivery system feeds the melted material to the processor or extruder consistently and at a specified feed rate and pressure. The present invention facilitates this by allowing the melted material to flow by gravity and have a gravitationally transition from the melting plates 28 to the holding section 18 of the apparatus, eliminating air entrapment.

The system in accordance with the present invention also preferably has several hundred square feet of melting surface area in the heated melt plate members 28. Further, the delivery pump 62 is steam heated and is controlled in a conventional manner to deliver the melted material at a consistent rate for commercial production.

While there have been described what are presently believed to be the preferred embodiments of the invention, those skilled in the art will realize that changes and modifications may be made thereto without departing from the spirit and scope of the invention, and it is intended to claim all such changes and modifications that fall within the scope of the invention as defined and covered by the following claims.

What is claimed is:

1. A method for processing high molecular weight elastomer material in an apparatus, said apparatus having a heated housing section and a holding section, and heated housing having at least one set of heated plate members in a fan-type grouping, said method comprising the steps of:

inserting the high molecular weight elastomer materials as a solid material into the heated housing;

positioning said material on the heated plate members;

heating said material in said housing section until said material melts and flows over said heated plate members and becomes liquefied;

conveying said liquefied material into said holding section.

2. The method as set forth in claim 1 wherein said apparatus also comprises a conduit section positioned between said housing section and said holding section, and wherein said method further comprises the step of conveying said liquefied material through said conduit section from said heated plate members and into said holding section.

3. The method as set forth in claim 1 wherein said apparatus also comprises at least one heated diverter member positioned immediately adjacent to said heated plate members, and wherein said method further comprises the step of conveying said liquefied material onto said at least one diverter member from said heated plate members and prior to conveying said liquefied material into said holding section.

4. The method as set forth in claim 1 further comprising the step of discharging said liquefied material from said holding section.

5. The method as set forth in claim 4 further comprising the steps of metering and feeding said liquefied material into a continuous extruder.

6. A method for melting high molecular weight elastomer materials in a melting apparatus, said melting apparatus having a housing, a storage section, a plurality of heated plate members arranged in at least one fan-shape grouping in said housing, and at least one diverter member positioned in said housing immediately adjacent to said heated plate members, said method comprises the steps of:

introducing said elastomer materials into said housing;

placing said elastomer materials on said plurality of heated plate members;

melting said elastomer materials on said plurality of heated plate members;

conveying said melted elastomer materials onto said at least one diverter member; and conveying said melted elastomer materials from said at least one diverter member into said storage section.

7. The method as set forth in claim 6 further comprising the step of heating said at least one diverter member.

8. The method as set forth in claim 6 further comprising the step of discharging said melted elastomer materials from said storage section.

9. The method as set forth in claim 8 further comprising the step of feeding said melted elastomer materials into a continuous extruder, wherein said melted elastomer materials are used as an ingredient of a chewing gum base product.

10. The method as set forth in claim 9 further comprising the step of metering said melted elastomer material into said continuous extruder, wherein a load cell mechanism is utilized.

11. The method as set forth in claim 6 further comprising the step of heating said housing.

12. The method as set forth in claim 6 further comprising the step of heating said storage section.

13. The method as set forth in claim 6 wherein said melting apparatus further comprises a conveyance section positioned between said housing and said storage section, and wherein said method further comprises the step of conveying said melted elastomer material from said housing into said conveyance section.

14. The method as set forth in claim 13 wherein said conveyance section has at least one surface member positioned at an angle to the vertical direction for directing said method elastomer material into said conveyance section without entrapment of air therein.

15. The method as set forth in claim 6 wherein said elastomer materials comprise polyisobutylene.

* * * * *